United States Patent
Bradel

(10) Patent No.: US 6,688,819 B1
(45) Date of Patent: Feb. 10, 2004

(54) MODULAR, MULTI-FUNCTION VEHICLE INTERFACE SYSTEM

(75) Inventor: Jeffrey A. Bradel, Centreville, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/895,111

(22) Filed: Jul. 2, 2001

(51) Int. Cl.⁷ .................................................. B60P 7/08
(52) U.S. Cl. .............................. 410/67; 410/66; 410/4; 410/8; 410/115; 410/11; 410/23; 410/30; 414/537
(58) Field of Search ........................... 410/66, 67, 115, 410/3, 4, 7, 8, 10, 11, 23, 30; 244/118.1, 137.1; 414/499, 537

(56) References Cited

U.S. PATENT DOCUMENTS

| | | | |
|---|---|---|---|
| 1,280,142 A | * 10/1918 | Bonner | |
| 1,949,218 A | 2/1934 | Owens | |
| 2,001,935 A | * 5/1935 | Otis | ............................ 410/67 |
| 2,858,774 A | * 11/1958 | Batter | ......................... 410/67 |
| 2,906,212 A | 9/1959 | Hayes | |
| 3,385,233 A | * 5/1968 | Mowatt et al. | ............... 410/67 |
| 3,920,205 A | * 11/1975 | Bell | ............... 410/4 |
| 4,024,820 A | 5/1977 | Hlinsky et al. | |
| 4,068,813 A | * 1/1978 | Chatwin et al. | ............... 410/7 |
| 4,307,985 A | * 12/1981 | Desprez et al. | ............... 410/46 |
| 4,693,651 A | 9/1987 | Stuart | |
| 4,836,337 A | 6/1989 | Borrelli | |
| 4,929,133 A | * 5/1990 | Wiseman | ..................... 410/52 |
| 5,437,536 A | 8/1995 | Bianca | |
| 5,865,579 A | * 2/1999 | Thomas | ..................... 410/92 |
| 6,113,326 A | 9/2000 | Nicholson | |
| 2002/0127075 A1 | * 9/2002 | Wassick | ....................... 410/4 |

* cited by examiner

Primary Examiner—Stephen T. Gordon
(74) Attorney, Agent, or Firm—Howard Kaiser

(57) ABSTRACT

Each guidance structure has two orthogonal surfaces (a horizontal surface and a vertical surface) which define the insides of an "L"-shaped profile. A first pair of guidance structures is positioned on a loading platform so that the corresponding vertical surfaces are parallelly facing either toward each other or away from each other. Alignedly therewith, a second pair of guidance structures is positioned on an ingress-egress platform (connected to the loading platform) so that the corresponding vertical surfaces are obliquely facing either toward each other or away from each other. Vehicular cargo travels the ingress-egress platform so as to be "funneled" by the back pair onto the loading platform. The front pair's horizontal surfaces operate as tracks for the cargo's wheels, thereby more widely distributing the loading associated with the cargo. The vertical surfaces of both pairs operate as lateral barriers for the cargo's wheels.

17 Claims, 10 Drawing Sheets

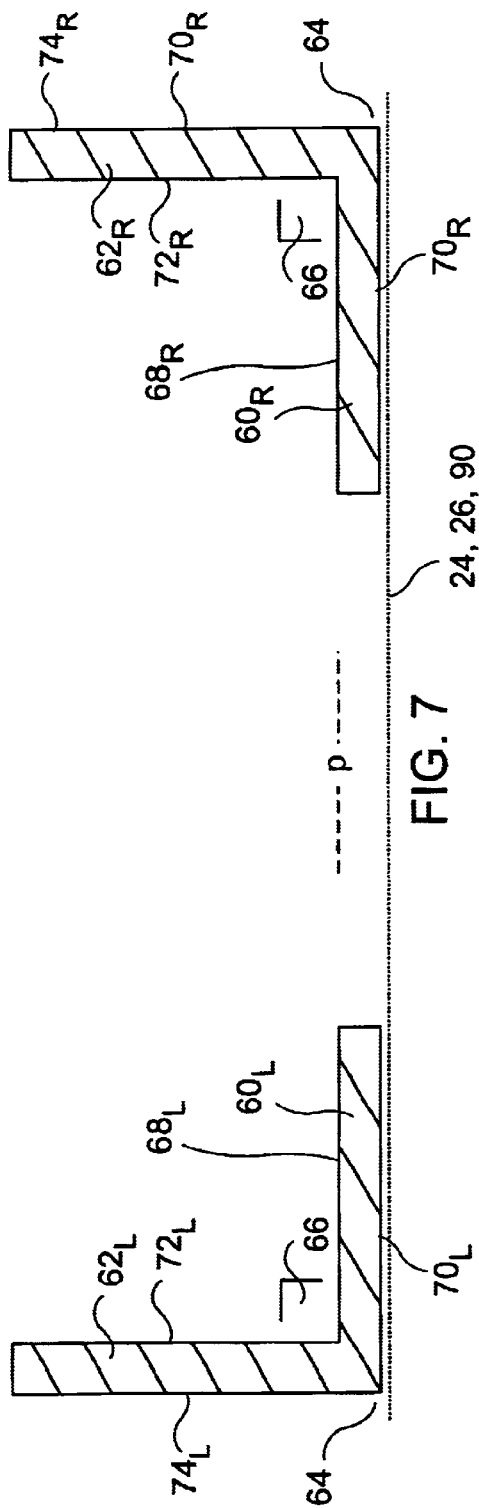
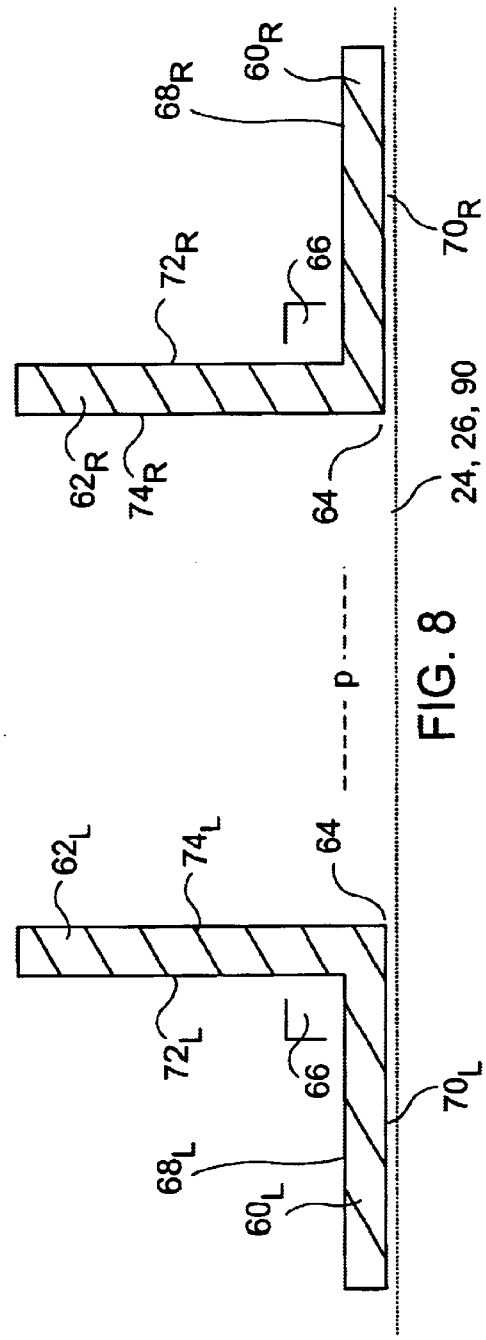
FIG. 7
FIG. 8

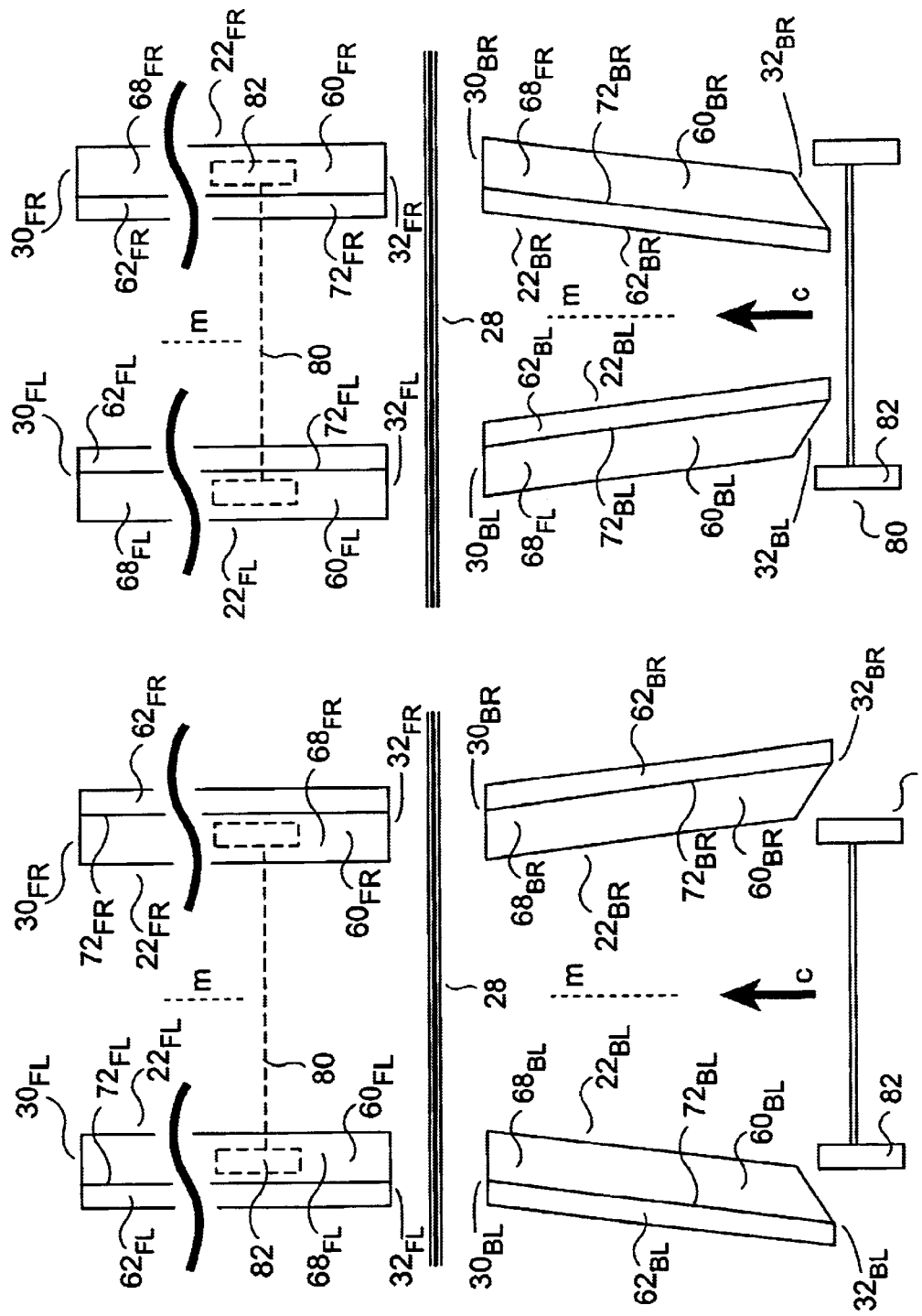

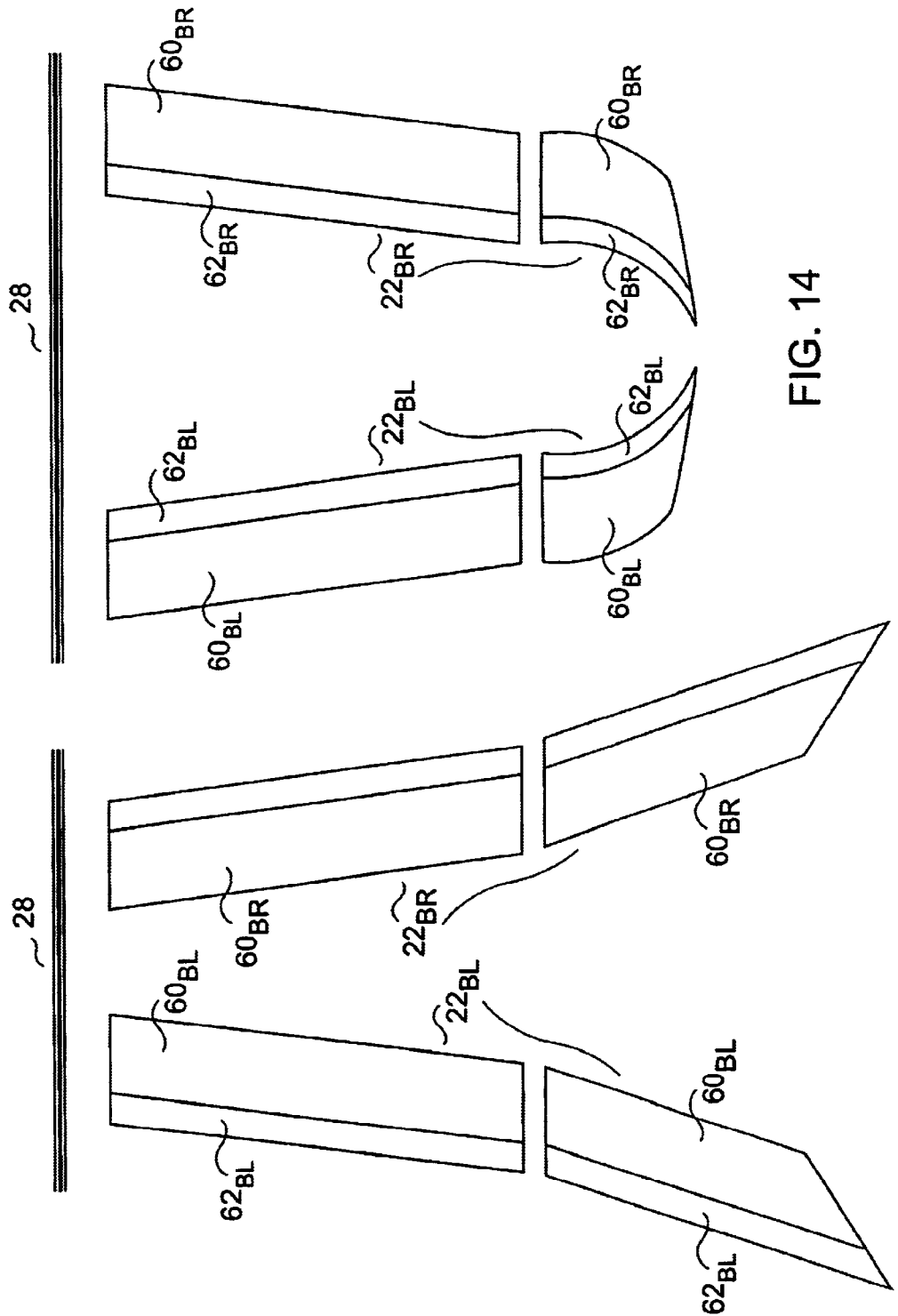

MODULAR, MULTI-FUNCTION VEHICLE INTERFACE SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to the transportation of objects such as goods and equipment by vehicles such as aircraft, trucks and trains, more particularly to methods and apparatuses for accomplishing, advancing or facilitating the loading of cargo thereon or the conveyance of cargo thereby.

A vehicle may be less than fully accommodating for purposes of conveying certain kinds of cargo, albeit that such conveyances represent highly desirable utilizations of such vehicle. Circumstances such as the limited cargo space of the vehicle and the size and characteristics of a particular cargo exemplify impediments to the safe and efficient transporting of such cargo by such vehicle.

A case in point is the transportation of a ground vehicle by a V-22 Osprey tilt rotor aircraft, as is presently envisioned by the U.S. Department of the Navy (especially, the U.S. Marine Corps). The V-22 aircraft is being produced to support a new U.S. Navy doctrine entitled "Operational Maneuver from the Sea." This U.S. Navy concept involves the implementation of V-22 tilt rotor aircraft to insert equipment and troops for various missions. Of particular note is the internal transport of highly mobile light tactical vehicles, which is inherently restricted by such factors as the size of the V-22 aircraft's cargo envelope and the capacity of the V-22 aircraft's flooring. The U.S. Navy is therefore desirous of overcoming several problems which are intrinsic to tactical vehicle transport inside a V-22 Osprey aircraft.

SUMMARY OF THE INVENTION

In view of the foregoing, it is an object of the present invention to provide method and apparatus for rendering easier, safer and more efficient the loading of transportee objects such as land vehicles aboard transporter objects such as air vehicles.

It is a further object of the present invention to provide method and apparatus for rendering easier, safer and more efficient the conveyance of transportee objects such as land vehicles by transporter objects such as air vehicles.

Many applications of the present invention involve the transportation of a ground vehicle via an air vehicle. The aforementioned transportation of ground vehicles via the new V-22 Osprey Tiltrotor aircraft is exemplary of such applications. In such contexts, the vehicular loading and conveyance system according to the present invention permits vehicles to be safely transported without fear of damage to either the aircraft or the ground vehicle, and without fear of injury to the crew. The inventive members attach to the floor and ramp of the V-22 aircraft to allow for safe, efficient and operationally suitable internal transport of vehicles. The V-22 aircraft is inherently capable of internally transporting only very light, small vehicles which are limited in terms of utility and capability. The inventive system permits high mobility tactical vehicles to be flight-certified for internal transport, and to be operationally suitable during combat operations.

The inventive system, typically comprising four cross-sectionally "L"-shaped members, serves as: (i) a vehicle guide; (ii) a floor load distribution system; (iii) a restraint mechanism; and, (iv) a pallet guide. This invention thus solves several problems with tactical vehicle transport inside the V-22 Osprey tiltrotor aircraft. The inventive system provides: (i) a positive mechanical guide system that minimizes or eliminates interference between the aircraft and ground vehicle; (ii) a floor load distribution system that allows transport of vehicles in heavier weight classes without damage to the aircraft floor; (iii) additional rigid attachment points for restraining vehicles during aggressive flight conditions; and, (iv) a dual-sided checking system that permits secure interposition of a pallet or other platform-like structure.

In accordance with the present invention, the inventive apparatus comprises two cross-sectionally approximately L-shaped devices. The inventive apparatus is for use relative to a holder entity and a holdee entity. The holdee entity has rollable means. Each inventive device includes a horizontal portion and a vertical portion, and is characterized by an approximately ninety degree interior angle. The inventive devices are associable with the holder so that the vertical portions are approximately parallel, so that the interior angles face approximately oppositely, so that the horizontal portions thereby serve as both a track and a support for the rollable means, and so that the vertical portions thereby serve as a bilateral barrier for the rollable means.

According to typical inventive embodiments, the inventive apparatus further comprises adjustability means, for adjusting the distance between the vertical portions whereby the vertical portions remain approximately parallel. Also according to typical inventive embodiments, the inventive apparatus further comprising attachability means, attaching the inventive devices to the holder entity. Further according to typical inventive practice, the inventive devices are associable with the holder so that the inventive devices are approximately straight, so that the horizontal portions lie approximately in the same imaginary plane, and so that the interior angles face in a mutual direction which is either: approximately toward each other; or, approximately away from each other.

According to frequent inventive practice, the inventive apparatus comprises four cross-sectionally approximately L-shaped devices. The inventive devices described in the preceding two paragraphs are the first inventive device and the second inventive device. The horizontal portions described in the preceding two paragraphs are the first horizontal portion and the second horizontal portion. The vertical portions described in tile preceding two paragraphs are tile first vertical portion and the second vertical portion. The first inventive device includes the first horizontal portion and the first vertical portion. The second inventive device includes the second horizontal portion and the second vertical portion. The interior angles described in the preceding two paragraphs are the first interior angle and the second interior angle. The first inventive device is characterized by the first interior angle. The second inventive device is characterized by the second interior angle. The third inventive device includes the third horizontal portion and the third vertical portion. The fourth device includes the fourth horizontal portion and the fourth vertical portion. The third inventive device is characterized by an approximately ninety degree interior angle which is the third interior angle. The fourth inventive device is characterized by an approximately ninety degree interior angle which is the fourth interior angle.

According to typical such inventive embodiments, the third inventive device and the fourth inventive device are associable with the holder entity so that the third vertical portion and the fourth vertical portion are at least substantially nonparallel, so that the third interior angle and the fourth interior angle face approximately oppositely, so that the horizontal portions thereby serve as both a track and a support for said rollable means, and so that the vertical portions thereby serve as a bilateral barrier for the rollable means. Also according to typical such inventive embodiments, the third inventive device and the fourth inventive device are associable with the holder entity so that the third interior angle and the fourth interior angle face in a mutual direction which is either: approximately toward each other; or, approximately away from each other. Further according to typical such inventive embodiments, the first inventive device is characterized by a first front extremity and a first back extremity; the second inventive device is characterized by a second front extremity and a second back extremity; the third inventive device is characterized by a third front extremity and a third back extremity; and, the fourth inventive device is characterized by a fourth front extremity and a fourth back extremity. The first inventive device, the second inventive device, the third inventive device and the fourth inventive device are associable with the holder entity so that the first back extremity and the third front extremity are in approximate alignment and so that the second back extremity and the fourth front extremity are in approximate alignment. According to some inventive embodiments, the first front extremity and the second front extremity are each characterized by an upward curvature for stopping the rollable means.

In the absence of the inventive system, ground vehicles could not be "flight certified" for internal transport in the V-22 Osprey vehicle. The V-22 Osprey has a limited floor load capability; the front pair of inventive devices distributes the vehicle loads over a larger area, thereby minimizing or eliminating damage to the aircraft, and allowing transport of tactical vehicles. Furthermore, the back pair of inventive devices is characterized by a tapered or flared configuration, thereby serving as a funnel-like channel for guiding and controlling the vehicle's alignment during aircraft ingress and egress. It is often preferable inventive practice that the respective transverse back (leading) edges of the back pair of inventive devices be slanted, thereby enhancing the funnel-like channeling therethrough of the vehicle. In addition, after vehicle insertion in the aircraft, the inventive system can be used to provide additional attachment points for vehicle restraint. Moreover, the inventive system admits of embodiment as a "kit" which can be removed from an aircraft and, if desired, adapted to other aircraft.

The inventive system hence allows for rapid loading and unloading during hazardous combat and environmental conditions, an advantage that is critical while operating in a "hot" landing zone. The present invention represents a new and improved loading and conveyance system for diverse means of transportation such as the V-22 and other aircraft, thus adding a significant capability to diverse entities such as the U.S. Navy's military fleet. Transport of high mobility, tactical vehicles in the V-22 aircraft offers tremendous capability during combat operations. The ability to carry a tactical vehicle inside the V-22 is a key enabler in the execution of the U.S. Navy's future warfighting approach.

Typical embodiments of the inventive system are modular and lightweight and provide additional tiedown points; depending on the inventive embodiment, the present invention is designed to be lightweight and modular so that it can be easily removed for storage or remounted again for future use. The inventive components can adjust laterally and can be arranged to guide either the insides or the outsides of the transported object's wheels (e.g., tires); accordingly, the inventive system serves both as a true guide system and as a true vehicular load distribution system.

Other objects, advantages and features of this invention will become apparent from the following detailed description of the invention when considered in conjunction with the accompanying drawings.

BRIEF DESCRIPTION OF THE DRAWINGS

In order that the present invention may be clearly understood, it will now be described, by way of example, with reference to the accompanying drawings, wherein like numbers indicate the same or similar components, and wherein:

FIG. 7 is a diagrammatic cross-sectional view of a front or back unit of an inventive apparatus embodiment similar to that shown in FIG. 3, particularly illustrating the inwardly facing disposition of the guide rails.

FIG. 8 is a diagrammatic cross-sectional view, of a front or back unit of an inventive apparatus embodiment similar to that shown in FIG. 1, particularly illustrating the outwardly facing dispositions of the guide rails.

FIG. 9 is a diagrammatic partial top plan view of the front and back units of an inventive apparatus embodiment similar to that shown in FIG. 3, particularly illustrating the inwardly facing dispositions of the guide rails, the forward-inwardly slanted dispositions of the back unit's back edges, and the relative movement of wheeled cargo.

FIG. 10 is a diagrammatic partial top plan view of the front and back units of an inventive apparatus embodiment similar to that shown in FIG. 1, particularly illustrating the outwardly facing dispositions of the guide rails, the backward-inwardly slanted dispositions of the back unit's back edges, and the relative movement of wheeled cargo.

FIG. 13 and FIG. 14 are diagrammatic top plan views of other embodiments of back unit guide rails in accordance with the present invention.

DETAILED DESCRIPTION OF THE INVENTION

Figure 1:
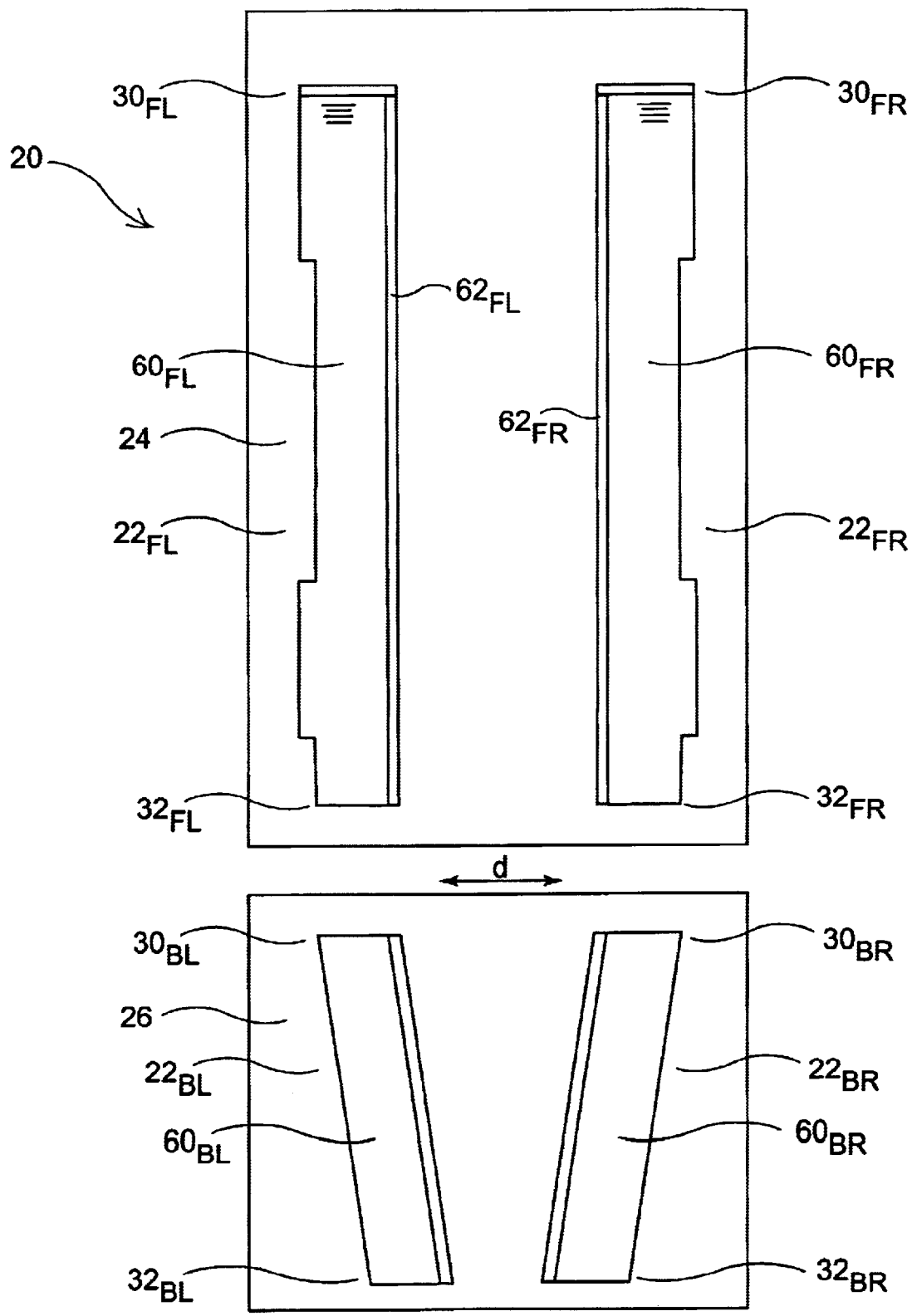
FIG. 1 is a diagrammatic top plan view of an embodiment of vehicular loading and conveyance apparatus in accordance with the present invention, wherein the guide rails describe brackets facing outwardly.
Figure 2:
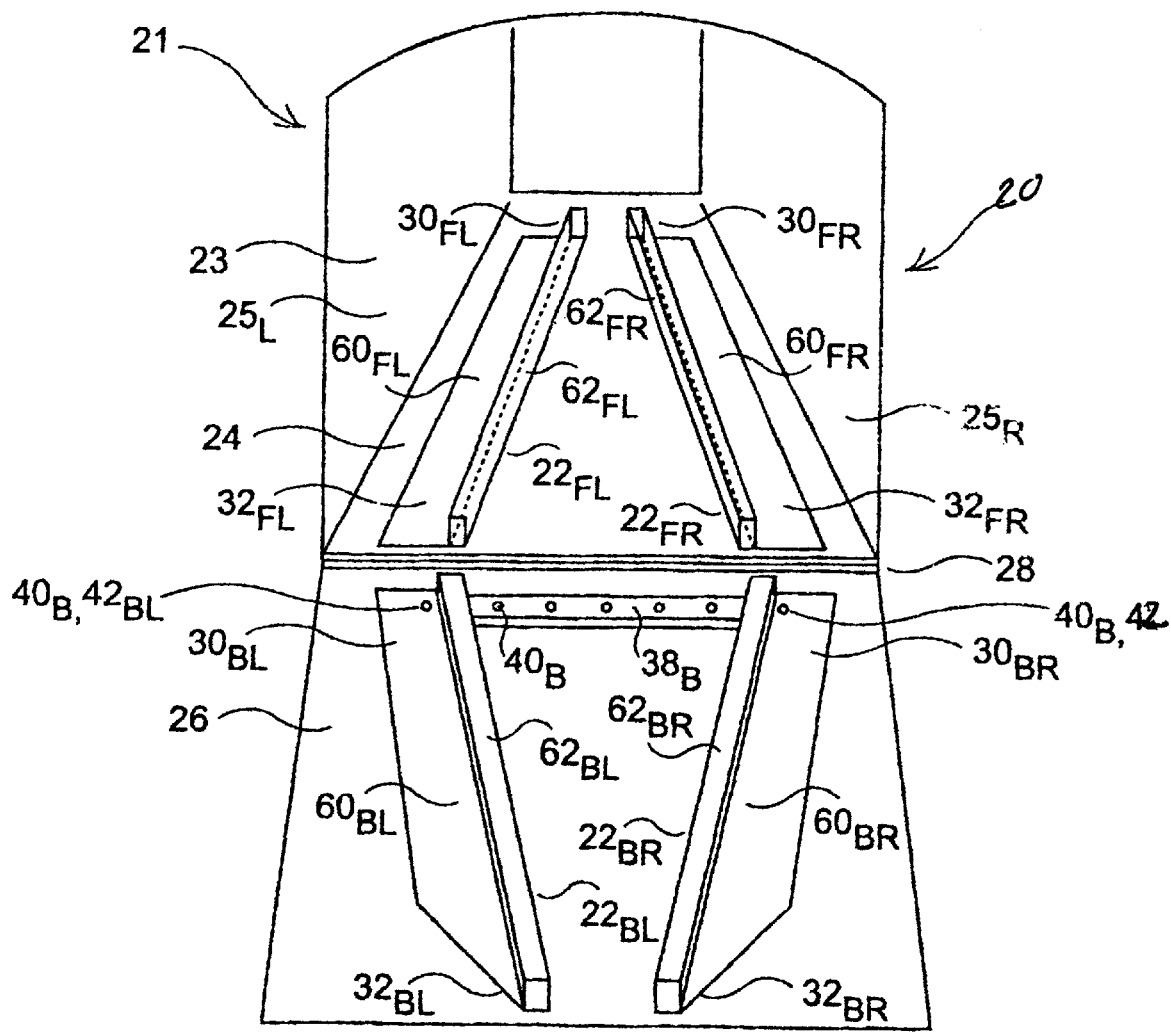
FIG. 2 is a diagrammatic partial back perspective view of a typical U.S. Navy V-22 Osprey air vehicle, particularly showing the cargo platform and cargo ramp of the air vehicle, especially illustrating the association therewith of an inventive apparatus embodiment which is similar to the prototypical inventive embodiment which is currently being tested by the U.S. Navy, and which is similar to that shown in FIG. 1 in that the guide rails describe brackets facing outwardly.

Referring now to FIG. 1 and FIG. 2, inventive guide system 20 comprises a front left guide rail $22_{FL}$, a front right guide rail $22_{FR}$, a back left guide rail $22_{BL}$ and a back right guide rail $22_{BR}$. The front pair of guide rails, $22_{FL}$ and $22_{FR}$, represents the front unit of inventive system 20. The back pair of guide rails, $22_{BL}$ and $22_{BR}$, represents the back unit of inventive system 20. The two front guide rails, $22_{FL}$ and $22_{FR}$ are mounted in the main cargo area 23. The two back guide rails, $22_{BL}$ and $22_{BR}$ are mounted on the cargo ramp 26.

FIG. 2 is generally illustrative of inventive experimentation which has been conducted by the U.S. Navy using a prototypical inventive system 20 in association with a V-22 Osprey air vehicle 21. The V-22 aircraft 21 includes a cargo compartment 23, a generally rectangular interior space, which has a cargo storage platform 24 and a cargo ramp 26. Ramp 26, part of a hinged door provided in the aircraft's underside, leads to platform 24 and is vertically pivotable via a mechanism such as a hinge 28. When ramp 26 is rotated completely upward, it seals and is effectively made an integral part of cargo area 23. When ramp 26 is rotated appropriately downward, it can function as a ramp means for loading cargo aboard the aircraft.

Each guide rail 22 is generally slender, elongate or oblong, having a front longitudinal end and a back longitudinal end. Front left guide rail $22_{FL}$ has a front end $30_{FL}$ and a back end $32_{FL}$. Front right guide rail $22_{FR}$ has a front end $30_{FL}$ and a back end $32_{FR}$. Back left guide rail $22_{BL}$ has a front end $30_{BL}$ and a back end $32_{BL}$. Back right guide rail $22_{BR}$ has a front end $30_{BR}$ and a back end $32_{BR}$. The guide rails 22 contained in the figures herein are shown to be of varying lengths for illustrative purposes. In the light of this disclosure, it will be understood by the ordinarily skilled artisan that the dimensions of and distances between the guide rails 22 can vary widely, in keeping with inventive principles.

Figure 3:
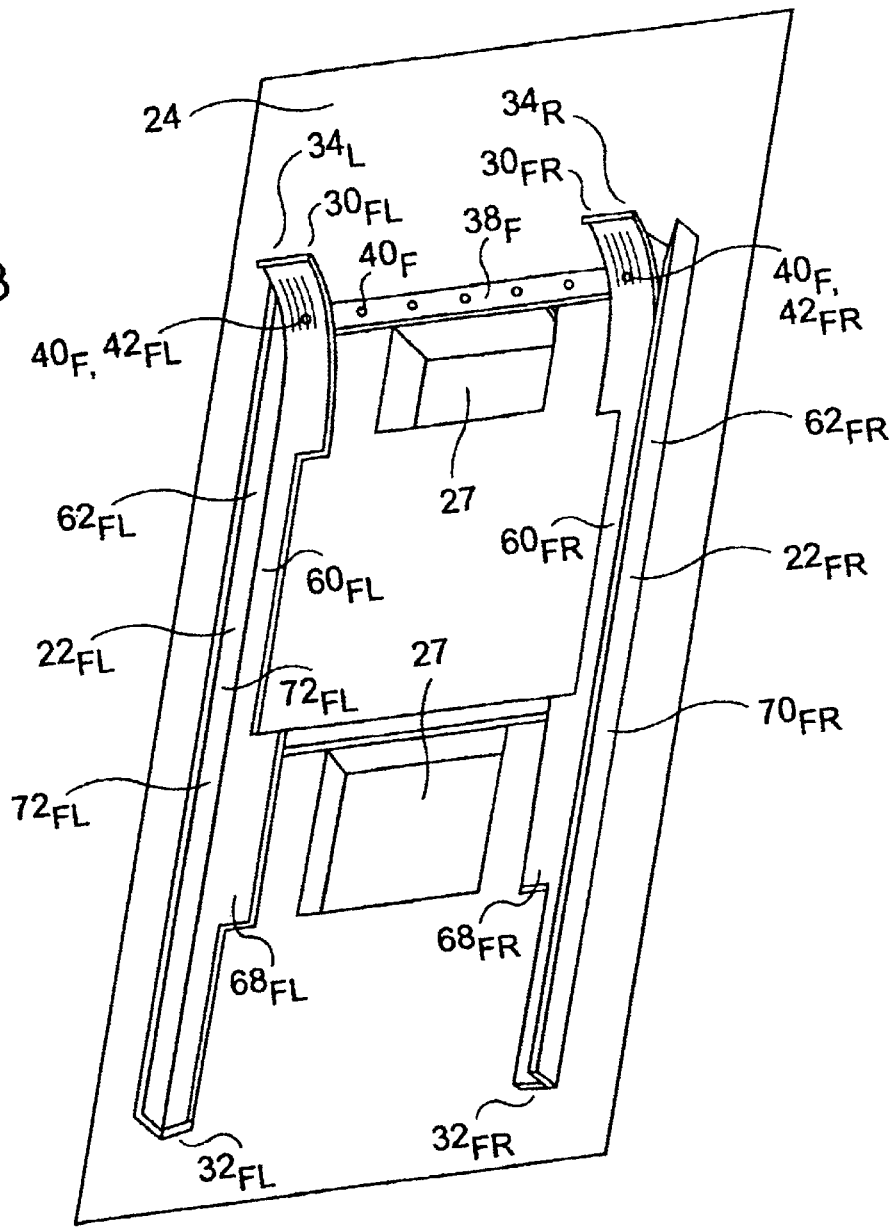
FIG. 3 is a diagrammatic partial perspective view of another inventive apparatus embodiment, showing the front unit of the inventive apparatus, wherein the guide rails describe brackets facing inwardly.

Still referring to FIG. 1 and FIG. 2 and also referring to FIG. 3, inventive system 20 can be mounted so as to guide either the insides or the outsides of the wheels (e.g., tires) on a vehicle or other rollable cargo entity having plural wheels, usually including at least one (and more typically, at least two) pairs of coaxial wheels. As shown in FIG. 1 and FIG. 2, guide rails 22 are disposed for guidance in relation to the insides of the cargo wheels. Inventive system 20 shown in FIG. 3, by contrast, has front guide rails $22_{FL}$ and $22_{FR}$ disposed for guidance in relation to the outsides of the cargo wheels.

Figure 5:
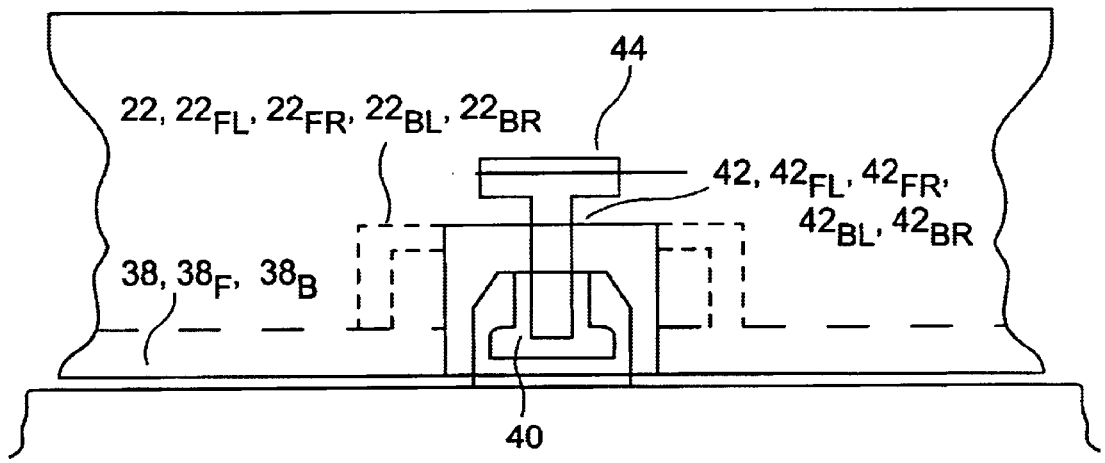
FIG. 5 is a diagrammatic partial end elevation view, partially in section, of a guiderail of an inventive apparatus embodiment similar to that shown in FIG. 1 or FIG. 3, particularly illustrating the attachment of the guide rail with respect to the foundation of the cargo area or the ramp.

The forwardmost end of inventive system 20 can have front stoppage means, which can serve to halt and/or station the vehicular cargo at the proper position, and which can also serve as a forward restraint means for securing the vehicular cargo. Depicted in FIG. 5 are integral wheel stops $34_L$ and $34_R$ which can be inventively practiced regardless of whether the interior "L"-shape defined by front guide rails $22_{FL}$ and $22_{FR}$ face away from each other (such as shown in FIG. 1) or toward each other (such as shown in FIG. 3). The front ends $30_{FL}$ and $30_{FR}$ of the two front guide rails $22_{FL}$ and $22_{FR}$ are upwardly curved so as to form the two front stops $34_L$ and $34_R$, respectively. In the light of this disclosure, other types of stoppage means which can be inventively practiced will be apparent to the ordinarily skilled artisan.

As portrayed in FIG. 3, front guide rails $22_{FL}$ and $22_{FR}$ are not of uniform thickness (width or breadth) from front ends $30_{FL}$ and $30_{FL}$ to back ends $72_{FL}$ and $32_{FR}$. Depending on the application, inventive practice may preferably provide either uniformly thick front guide rails $22_{FL}$ and $22_{FR}$, such as shown in FIG. 2, or variably thick front guide rails $22_{FL}$ and $22_{FR}$, such as shown in FIG. 3. The important consideration in this regard is that the horizontal support portions of front guide rails $22_{FL}$ and $22_{FR}$ be sufficiently thick throughout their extent to accommodate the cargo wheels; that is, the relative dimensions of inventive system 20 and the cargo's rolling system must be compatible so that, practically speaking, when the cargo wheels are to any extent within the realm of front guide rails $22_{FL}$ and $22_{FR}$ the cargo wheels are at all times being supported by front guide rails $22_{FL}$ and $22_{FR}$.

Figure 4:
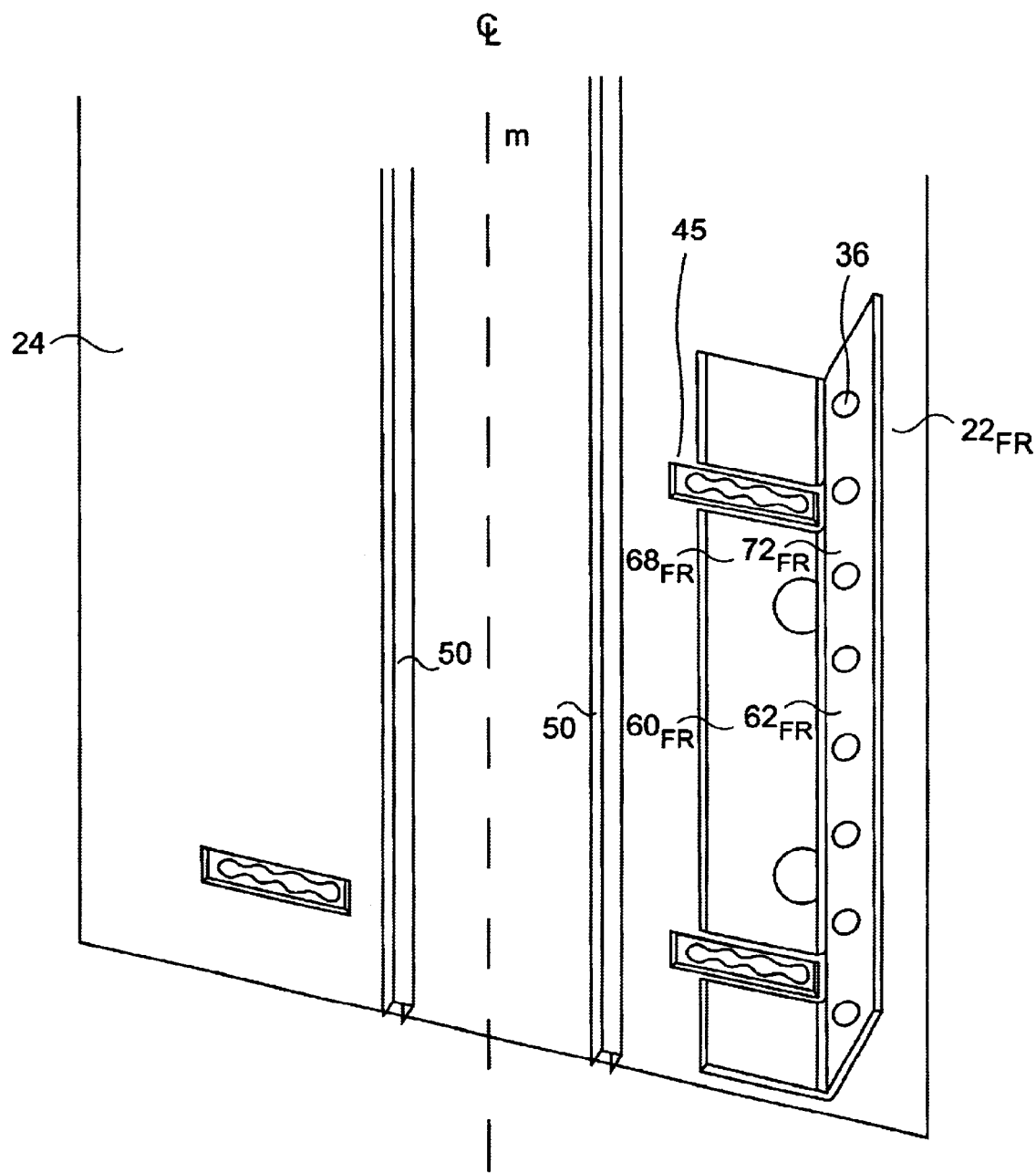
FIG. 4 is a diagrammatic partial perspective view of an inventive apparatus embodiment similar to that shown in FIG. 3, partially showing the front unit of the inventive apparatus, wherein the guide rails describe brackets facing inwardly.

With reference to FIG. 4, front guide rail $22_F$ is provided with tie-down apertures 36 which may be used along with chains for securing the cargo, once appropriately positioned in cargo area 24, with respect to front guide rail $22_F$. As previously noted herein, either or both of front stops $34_L$ and $34_R$ can also be utilized for securement purposes. The ordinarily skilled artisan who reads this disclosure will understand how similar and other known securement techniques can be implemented in inventive practice. Depending on the application, it may or may not be necessary to effect such securement. In some inventive contexts, the weight of the cargo may suffice for maintaining a fixed position of the cargo during transit of the transport vehicle.

Many inventive embodiments preferably include lateral adjustability means, hit for inwardly-outwardly adjusting guide rails 22 to different cargo vehicle track widths. As shown by bidirectional arrows d in FIG. 1 and FIG. 4, either or both of front guide rails $22_{FL}$ and $22_{FR}$ are laterally adjustable, toward or away from imaginary medial line m. Similarly shown in FIG. 1 is how either or both of back guide rails $22_{BL}$ and $22_{BR}$ can be laterally adjustable, toward or away from imaginary medial line m.

Still referring to FIG. 3 and also referring to FIG. 5, lateral adjustability of the guide rails 22 can be mechanically accomplished in many ways, such as involving plural apertures 40. For instance, in certain applications involving transport vehicles such as the V-22 aircraft, the transport vehicle will analogously include existing transverse structures 38, such as cross members $38_F$ shown in FIG. 3, which are originally provided with (or which lend themselves to being subsequently provided with) equally spaced cross member holes 40. Platform 24 has one or more cross members $38_F$ provided with holes $40_F$. Similarly, it may be envisioned that ramp 26 have one or more cross members $38_B$ provided with holes $4_F$. Such holes 40 can afford side-to-side adjustability in equivalent (e.g., one-inch) increments. As another example, adjustability may be afforded by one or more ratchet-like like or toothed mechanisms 45 such as shown in FIG. 4.

It may be preferable that both guide rail unit pairs (i.e., both the front pair of guide rails $22_{FL}$ and $22_{FR}$ and the back pair of guide rails $22_{BL}$ and $22_{BR}$) be endowed with such adjustability, since frequently preferred inventive practice demands that the front rail back ends $32_{FL}$ and $32_{FR}$ be aligned with the back rail front ends $30_{BL}$ and $30_{BR}$. It may be also preferable that both guide rails of a guide rail unit pair (e.g., the front pair of guide rails $22_{FL}$ and $22_{FR}$, and/or the back pair of guide rails $22_{BL}$ and $22_{BR}$) be similarly accorded adjustment capability, so as to maintain equidistance thereof from imaginary medial line m.

It is noted that, according to some mechanical arrangements used in inventive practice, the lateral adjustability means of guide rails 22 will be integrated or interrelated with the attachment means of guide rails 22 with respect to cargo platform 24 or cargo ramp 26, as the case may be. As shown in FIG. 3 and FIG. 5, for example, the holes 40, provided in cross members $38_F$ serve the dual purpose of (i) promoting attachment of front guide rails $22_{FL}$ and $22_{FR}$ with respect to platform 24 and (ii) promoting adjustability of front guide rails $22_{FL}$ and $22^{FR}$ in terms of distance from each other. Similarly, as shown in FIG. 2 and FIG. 5, for example, the holes $40_B$ provided in cross members $38_B$ serve the dual purpose of (i) promoting attachment of back guide rails $22_{BL}$ and $22_{BR}$ with respect to ramp 26 and (ii) promoting adjustability of back guide rails $22_{BL}$ and $22_{BR}$ in terms of distance from each other.

According to attachment arrangements involving cross member holes 40, guide rails 22 are provided with apertures 42 which are suitably alignable with cross member holes 40. For instance, it may be envisioned that front guide rails $22_{FL}$ and $22_{FR}$ be provided with front guide rail holes $42_{FL}$ and $42_{FR}$. Similarly, it may be envisioned that back guide rails $22_{BL}$ and $22_{BR}$ be provided with back guide rail holes $42_{BL}$ and $42_{BR}$. Cross member holes 40 and guide rail holes 42 are appropriately paired and aligned, and fasteners (e.g., bolts) 44 are disposed therethrough.

Figure 6:
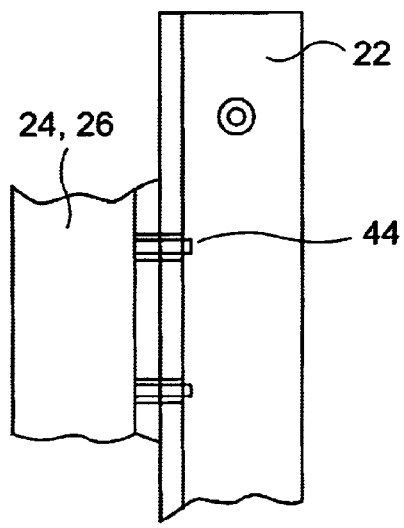
FIG. 6 is a diagrammatic partial top plan view of a guide rail (e.g., a right front guide rail) of an inventive apparatus embodiment similar to that shown in FIG. 1, particularly illustrating an alternative means of attachment of the guide rail with respect to the foundation of the cargo area or the ramp.

It will be apparent to the ordinarily skilled artisan who reads this disclosure that guide rails 24 can be coupled with foundations in varieties of ways or combinations of ways. For instance, in addition to or instead of providing bolt-type fasteners 44 through both guide rail holes 42 and cross member holes 40, fasteners 44 can be provided thorough both guide rail holes 42 and foundation holes 40 which are voids made directly in the foundation itself In the front section of inventive system 20, tile foundation includes platform 24. In the back section of inventive system 20, tile foundation includes ramp 26. Additionally or alternatively, as shown in FIG. 6, clasp-like fasteners 44 can be implemented for coupling guide rails 22 with the foundation, whether the foundation include a platform 24 or a ramp 26.

Regarding the V-22 Osprey aircraft, front guide rails $22_{FL}$ and $22_{FR}$ can be mounted inside the aircraft's cargo compartment 23 in various ways. As previously noted herein, front guide rails $22_{FL}$ and $22_{FR}$ can be attached to the existing cross members $38_F$, perhaps also so as to provide incremental lateral adjustments. Alternatively or additionally, front guide rails $22_{FL}$ and $22_{FR}$ can be dropped into the existing cargo roller rail trough of cargo compartment 23. Alternatively or additionally, front guide rails $22_{FL}$ and $22_{FR}$ can be coupled with the aircraft by mating with the floor structure inside the forward and aft cargo hook hatches 27 of cargo compartment 23.

Again referring to FIG. 3 and FIG. 4, inventive system 20 can propitiously include or be combined with a portable platform such as pallet 48. For instance, pallet 48 can be slid onto (as indicated by arrow p in FIG. 3) or otherwise situated upon the top horizontal surfaces $68_{FL}$ and $68_{FR}$, respectively, of front guide rails $22_{FL}$ and $22_{FR}$, conformingly between the side vertical surfaces 72 of front guide rails $22_{FL}$ and $22_{FR}$. It may be preferable that front guide rails $22_{FL}$ and $22_{FR}$ are laterally adjustable so as to permit contiguity thereof in r elation to, respectively, the left cargo area 24 wall 25 and the right cargo area 24 wall 25, such as illustrated in FIG. 2; in this manner, the floor space associated with pallet 48 may be maximized.

According to some inventive embodiments, the interior track (top horizontal) surfaces $68_{FL}$ and $68_{FR}$ of front guide rails $22_{FL}$ and $22_{FR}$ can be used as skid surfaces for the sliding and placement thereon of unwheeled cargo (e.g., one or more boxes or other heavy objects having a width which conforms with the distance between the side vertical surfaces 72 of front guide rails $22_{FL}$ and $22_{FR}$), which object 48 can also be conceived to represent. Platform 24 may already include, or can be provided with, folds, corrugations or other projections, such as the two parallel ridges 50 shown in FIG. 4, which facilitate the slidable loading and supporting of cargo. Ridges 50 are equidistant from imaginary medial line m, the longitudinal axis of platform 24. In some embodiments of inventive practice, ridges 50 can represent markers for helping to demarcate the imaginary medial line m of platform 24, thus serving as useful visual references when laterally adjusting front guide rails $22_{FL}$ and $22_{FR}$.

Reference now being made to FIG. 7 and FIG. 8, each guide rail 22 describes in cross-section an "L" shape or a mechanical bracket shape. Guide rails 22 each include a planar horizontal track portion 60 and a planar vertical delimitation portion 62 which meet at a linear junctional edge 64. Every guide rail 22 defines an interior right angle 66; in particular, the interior surfaces 68 and 72, respectively, of track portion 60 and delimitation portion 62 form interior right angle 66. Track portion 60 includes interior track surface 68 and exterior track surface 70. Delimitation portion 62 includes interior delimitation surface 72 and exterior delimitation surface 74. The terms "interior" and "exterior," as used herein in relation to surfaces of track portion 60 and delimitation portion 62, refer to the orientations of such surfaces with respect to interior right angle 66.

Still referring to FIG. 7 and FIG. 8, and also referring to FIG. 9 and FIG. 10, inventive practice will generally dictate that interior track surfaces 68 and interior delimitation surfaces 72 be the key functional surfaces insofar as the loading and stowing of cargo 80 are concerned. In such regards, the most important surfaces of inventive guide rails 22 are the supportive surfaces (generally, interior track surfaces 68) and the restrictive surfaces (generally, interior delimitation surfaces 72). Typically, these supportive and restrictive surfaces will be flat and characterized by orthogonality; that is, each pair of supportive and restrictive surfaces will be disposed at a ninety-degree angle wherein, functionally speaking, the supportive surfaces are horizontal and the restrictive surfaces are vertical.

According to typical inventive practice, regardless of whether the interior angles 66 of two paired guide rails 22 face toward each other or away from each other: (i) the interior track surfaces 68 will function as the underneath supportive surfaces for the movement and/or stationing of the cargo; and, (ii) the interior delimitation surfaces 72 will function as the laterally adjacent restrictive surfaces for the movement and/or stationing of the cargo. As shown in FIG. 7 and FIG. 9, the interior angles 66 of a given pair of guide rails 22 face toward each other; hence, the interior delimitation surfaces 72 function as the laterally adjacent restrictive surfaces, operable in relation to the outsides of the cargo wheels. In contrast, as shown in FIG. 8 and FIG. 10, the interior angles 66 of a given pair of guide rails 22 face away from each other; hence, the interior delimitation surfaces 72 function as the laterally adjacent restrictive surfaces.

It is noted that front guide rails $22_{FL}$ and $22_{FR}$ are interchangeable with each other, their lefthand side versus righthand side positions depending on whether the inventive embodiment is of the interior angles "facing-toward-each-other" variety (such as shown in FIG. 7 and FIG. 9) or of the interior angles "facing-away-from-each-other" variety (such as shown in FIG. 8 and FIG. 10). Hence, as illustrated in FIG. 9 and FIG. 10, front guide rails $22_{FL}$ and $22_{FR}$, respectively, in FIG. 9 are identical to front guide rails $22_{FR}$ and $22_{FL}$, respectively, in FIG. 10. Similarly, back guide rails $22_{BL}$ and $22_{BR}$, respectively, in FIG. 9 are identical to front guide rails $22_{BR}$ and $22_{BL}$, respectively, in FIG. 10.

Generally, regardless of whether the inventive embodiment is of an inwardly facing (interior-angles-facing-toward-each-other) kind or an outwardly facing (interior-angles-facing-away-from-each-other) kind, front left guide rail $22_{FL}$ and front right guide rail $22_{FR}$—in particular, their interior delimitation surfaces $72_{FL}$ and $72_{FR}$—will be parallel to each other and to imaginary medial line m. Further, most inventive embodiments will provide that front guide rails $22_{FL}$ and $22_{FR}$—in particular, their interior delimitation surfaces $72_{FL}$ and $72_{FR}$—be equidistant from imaginary medial line m. Front left interior track surface $68_{FL}$ and front right interior track surface $68_{FR}$ will normally lie in the same imaginary plane p—i.e., be coplanar with respect to each other.

Similarly, back left interior track surface $68_{BL}$ and back right interior track surface $68_{BR}$ will normally lie in the same imaginary plane p—i.e., be coplanar with respect to each other. However, as distinguished from front guide rails $22_{FL}$ and $22_{FR}$, frequent inventive practice dictates that back left guide rail $22_{BL}$ and back right guide rail $22_{BR}$ be nonparallel in r elation to each other, obliquely oriented at equal but opposite angles with respect to imaginary medial line m. If the inventive embodiment is of a facing-toward-each-other kind, many embodiments preferably situate back guide rails $22_{BL}$ and $22_{BR}$ so as to flair outward (away from imaginary medial line m) in the direction of front guide rails $22_{FL}$ and $22_{FR}$, such as shown in FIG. 9. On the other hand, if the inventive embodiment is of a facing-away-from-each-other kind, many embodiments preferably situate back guide rails $22_{BL}$ and $22_{BR}$ so as to flair inward (toward imaginary medial line m) in the direction of front guide rails $22_{FL}$ and $22_{FR}$, such as shown in FIG. 2 and FIG. 10.

Furthermore, it may be beneficial to horizontally slant each of back guide rails $22_{BL}$ and $22_{BR}$ at the back ends thereof, $32_{BL}$ and $32_{BR}$, respectively. For instance, if back guide rails $22_{BL}$ and $22_{BR}$ describe inward-facing brackets, then each of back guide rails $22_{BL}$ and $22_{BR}$ (in particular, horizontal portions $60_{BL}$ and $60_{BR}$ at respective back ends $32_{BL}$ and $32_{BR}$) can be equivalently and oppositely slanted, forwardly and inwardly, toward imaginary medial line m, such as shown in FIG. 9. On the other hand, if back guide rails $22_{BL}$ and $22_{BR}$ describe outward-facing brackets, then each of back guide rails $22_{BL}$ and $22_{BR}$ (in particular, horizontal portions $60_{BL}$ and $60_{BR}$ at respective back ends $32_{BL}$ and $32_{BR}$) can be equivalently and oppositely slanted, backwardly and inwardly, toward imaginary medial line m, such as shown in FIG. 10.

The front guide rails $22_{FL}$ and $22_{FR}$ are situated in alignment with the back guide rails $22_{BL}$ and $22_{BR}$ so that a wheelable cargo 80 can smoothly transition from the back (ramp 26) section to the front (platform 24) section of inventive system 20. Back ends $32_{FL}$ and $32_{FR}$ of front guide rails $22_{FL}$ and $22_{FR}$ are respectively aligned with front ends $30_{BL}$ and $30_{BR}$ of back guide rails $22_{BL}$ and $22_{BR}$. In particular, the interior track surfaces $68_{BL}$ and $68_{BR}$ at the front ends $30_{BL}$ and $30_{BR}$ of back guide rails $22_{BL}$ and $22_{BR}$ should be even with the interior track surfaces $68_{FL}$ and $68_{FR}$ at the back ends $32_{FL}$ and $32_{FR}$ of front guide rails $22_{FL}$ and $22_{FR}$; the interior delimitation surfaces $72_{BL}$ and $72_{BR}$ at the front ends $30_{BL}$ and $30_{BR}$ of back guide rails $22_{BL}$ and $22_{BR}$ should be even with the interior delimitation surfaces $72_{BL}$ and $72_{FR}$ at the back ends $72_{FL}$ and $32_{FR}$ of front guide rails $22_{FL}$ and $22_{FR}$.

It is frequently preferable inventive practice that the front rail back ends $32_{FL}$ and $32_{FR}$ be distanced from the back rail front ends $30_{BL}$ and $30_{BR}$. This would be especially so in the presence of a hinge 28; under such circumstances, front rail back ends $32_{FL}$ and $32_{FR}$, and the back rail front ends $30_{BL}$ and $30_{BR}$, should each be sufficiently distanced from hinge 28 so as not to impede or interfere with the functionality (e.g., rotatability) of hinge 28.

For illustrative purposes, FIG. 9 and FIG. 10 each portray a single set (e.g., pair) of coaxial wheels 82 for cargo 80. The present invention can be practiced in association with singular or plural sets of coaxial wheels 82. The flaired configuration of back guide rails $22_{BL}$ and $22_{BR}$ serves to "funnel" cargo 80 toward and onto the interior track surfaces $68_{FL}$ and $68_{FR}$ of front guide rails $22_{FL}$ and $22_{FR}$ Front guide rails $22_{FL}$ and $22_{FR}$ are parallel so that their corresponding interior delimitation surfaces $72_{BL}$ and $72_{FR}$ are at a constant distance from each other which is compatible (e.g., slightly greater than) with the axial distance between the lefthand wheel(s) and the righthand wheel(s) of each of at least one set of coaxial wheels 82.

Still referring to FIG. 9 and FIG. 10 and again referring to FIG. 2, the cargo ramp 26 for a typical V-22 Osprey aircraft is designed to rotate downward and thereby afford rapid loading and deployment of troops and cargo at the rear of the aircraft. The V-22 Osprey's cargo ramp 26 has a static angle of about 16 degrees, and a maximum angle of about 18.5 degrees, with respect to the horizontal plane defined by platform 24. As cargo 80 proceeds up the slightly inclined ramp 26, wheels 82 approach platform 24 in a longitudinal direction and approach back guide rails $22_{BL}$ and $22_{BR}$ in a lateral direction. Thus, as shown in FIG. 9, as cargo 80 moves up ramp 26, moving generally in direction c, the wheel 82 outsides become increasingly near the interior delimitation surfaces $72_{BL}$ and $72_{BR}$ of back guide rails $22_{BL}$ and $22_{BR}$. By comparison, as shown in FIG. 2 and FIG. 10, as cargo 80 moves up ramp 26, moving generally in direction c, the wheel 82 insides become increasingly near the interior delimitation surfaces $72_{BL}$ and $72_{BR}$ of back guide rails $22_{BL}$ and $22_{BR}$.

When a set of wheels 82 reaches platform 24, each wheel 82 is next to a front guide rail $22_F$. The left wheel $82_L$ moves or sits upon left interior track surface $68_{FL}$, and the right wheel $82_R$ moves or sits upon right interior track surface $68_{FR}$. In FIG. 2 and FIG. 10, the inside surface of left wheel $82_L$ is adjacent to front left interior delimitation surface $72_{FL}$, and the inside surface of right wheel $82_R$ is adjacent to front right interior delimitation surface $72_{FR}$. In FIG. 9, the outside surface of left wheel $82_L$ is adjacent to front left interior delimitation surface $72_{FL}$, and the outside surface of right wheel $82_R$ is adjacent to front right interior delimitation surface $72_{FR}$. Left planar horizontal track portion $60_L$ and right planar horizontal track portion $60_L$ thus serve as integral "pads"—"built into" left front guide rail $22_{FL}$ and right front guide rail $22_{FR}$, respectively—which act to distribute the cargo 80 load over a greater area within platform 24, e.g., the aircraft floor.

Since the supportive surfaces (i.e., interior track surfaces 68) and the restrictive surfaces (i.e., interior delimitation surfaces 72) are the critical inventive surfaces in § terms of loading and stationing of cargo 80, inventive practice does not require that the non-supportive (base) surfaces (i.e., exterior track surfaces 70) and the nonrestrictive surfaces (i.e., exterior delimitation surfaces 74) be configured in either flat or mutually orthogonal fashion. Further, the lengths, widths and thicknesses of each of track portion 60 and delimitation portion 62 are variable, depending on the inventive embodiments and their applications. The absolute and relative dimensions of the supportive surfaces (i.e., interior track surfaces 68) and the restrictive surfaces (i.e., interior delimitation surfaces 72) are also variable, the most important considerations being that such supportive and restrictive surfaces suitably function in particular applications in accordance with inventive principles. Indeed, the inventive qualities of modularity and interchangeability will tend not to be compromised regardless of variations in shape such as addressed herein.

Figure 11:
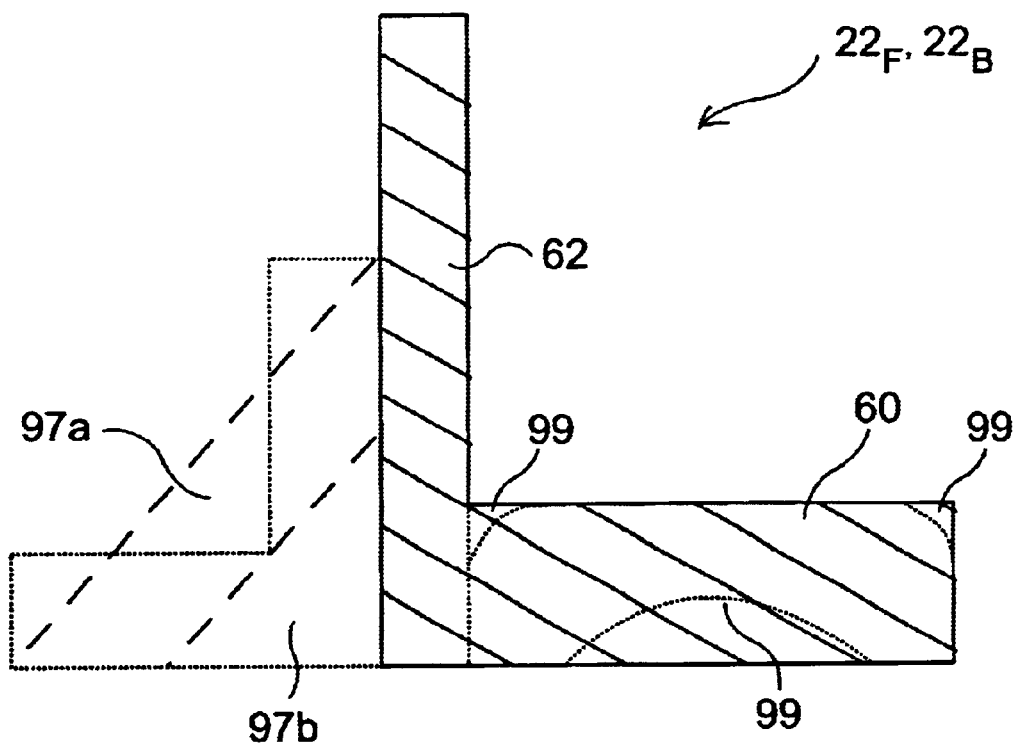
FIG. 11 and FIG. 12 are diagrammatic cross sectional views of different (e.g., variously configured) embodiments of back unit guide rails in accordance with the present invention.
Figure 12:
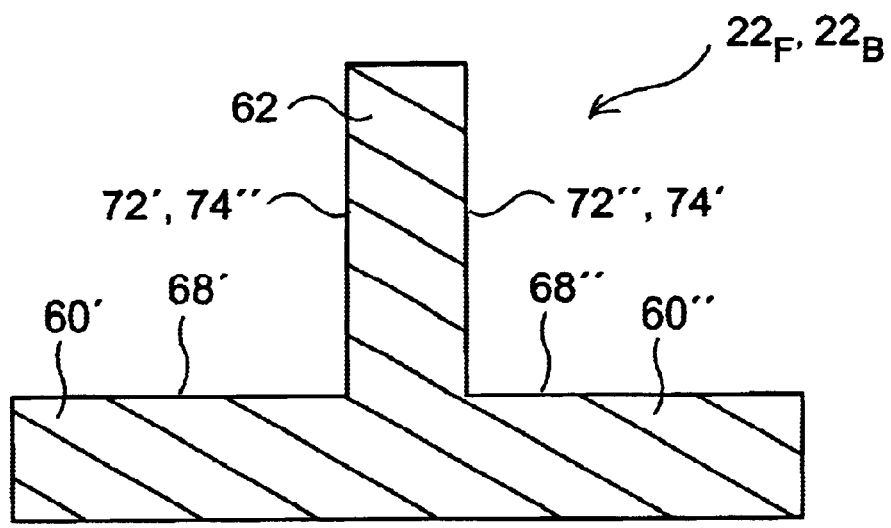

In fact, with reference to FIG. 11 and FIG. 12, it may be preferred inventive practice according to some embodiments that one or more (front and/or back) rails 22 include or be associated with bolstering means and/or support means such as bars, rods, struts, brackets, braces, etc. For instance, as shown in FIG. 11, guide rail 22 can be used in association with at least one strut 97a and/or at least one brace 97b. Additionally or alternatively, a guide rail 22 can represent an integral structure which is purposefully configured to further operability or to enhance one or more material properties such as strength, flexibility, robustness, etc., such as depicted in FIG. 11 by upper and lower curvatures 99 of horizontal guide rail portion 60. FIG. 11 can also be considered to show that horizontal guide rail portion 60 and vertical guide rail portion 62 are not necessarily parts of a single piece, but can represent separate pieces which are coupled to form a unitary structure or member.

FIG. 12 portrays a guide rail 22 having an inverted "T"-shaped profile which essentially represents a combination of two mirror-imaged "L"-shaped profiles, each having its own horizontal guide rail portion 60 but sharing the same vertical guide rail portion 62. Depending on the inventive application of guide rail 22, each vertical surface of guide rail 22 can represent either an interior vertical surface 72 or an exterior vertical surface 74. Such "T"-shaped inventive embodiments may be especially advantageous when the guide rails 22 are mounted to a foundation 90 and are afforded lateral adjustability; for instance, it may be desirable to be capable of adjusting one or both pairs of guide rails 22 so as to choose between inventive arrangements wherein the paired guide rails 22 describe inward-facing brackets, and those wherein the paired guide rails 22 describe outward-facing brackets.

In the light of this disclosure, the ordinarily skilled artisan will appreciate that diverse shapes of guide rails 22 are practicable in accordance with inventive principles. Generally speaking, regardless of configurational differences, guide rail 22 will essentially describe an "L"-shaped or bracket-shaped profile, insofar as guide rail 22 will include two adjoining, approximately orthogonal interior surfaces, viz., an interior horizontal surface 68 and an interior vertical surface 72.

Nevertheless, again with reference to FIG. 7 and FIG. 8, it is frequently preferred inventive practice that the exterior track surfaces 70 be flat and parallel to the interior track surfaces 68, so that exterior track surfaces can suitably be adjoined to or contiguous with the foundation surface 90, which (in the case of front exterior track surfaces $70_F$) may include the upper surface of a platform 24 or (in the case of back exterior track surfaces $70_B$) the upper surface of a ramp 26. Moreover, it may be preferable that the exterior delimitation surfaces 74 be flat and parallel to the interior delimitation surfaces 70, especially in order to afford proximity between front left exterior delimitation surfaces $74_L$ and cargo compartment 23 left wall $25_L$, as well as between front right exterior delimitation surfaces $74_L$ and cargo compartment 23 right wall $25_R$.

There are many possible variations pursuant to the principles of the present invention. For instance, as disclosed herein, front guide rails $22_{FL}$ and $22_{FR}$ which describe brackets facing outwardly can be inventively combined with back guide rails $22_{BL}$ and $22_{BR}$ which describe brackets facing outwardly. Or, as disclosed herein, front guide rails $22_{FL}$ and $22_{FR}$ which describe brackets facing inwardly can be inventively combined with back guide rails $22_{BL}$ and $22_{BR}$ which describe brackets facing inwardly. Or, as will be understood by the ordinarily skilled artisan in the light of this disclosure, front guide rails $22_{FL}$ and $22_{FR}$ which describe brackets facing outwardly can be inventively combined with back guide rails $22_{BL}$ and $22_{BR}$ which describe brackets facing inwardly. Or, as will be understood by the ordinarily skilled artisan in the light of this disclosure, front guide rails $22_{FL}$ and $22_{FR}$ which describe brackets facing inwardly can be inventively combined with back guide rails $22_{BL}$ and $22_{BR}$ which describe brackets facing outwardly.

Furthermore, in accordance with the present invention, front guide rails $22_{FL}$ and $22_{FR}$ admit of inventive practice in tile absence of back guide rails $22_{BL}$ and $22_{BR}$; also, back guide rails $22_{BL}$ and $22_{BR}$ admit of inventive practice in the absence of front guide rails $22_{FL}$ and $22_{FR}$. In addition, with reference to FIG. 13 and FIG. 14, back guide rails $22_{BL}$ and $22_{BR}$ need not each be entirely straight or rectilinear, but can each have a more complicated configuration (e.g., curvilinear, and/or a combination of curvilinear and rectilinear, and/or comprising two or more linearly or non-linearly aligned segments, etc.) which effectively furthers the inventive channeling of the wheeled cargo 80 along the ramp 26. During loading, ramp 26 can be positioned so as to be inclined downward toward platform 24, inclined upward toward platform 24, or level with platform 24.

Figure 15:
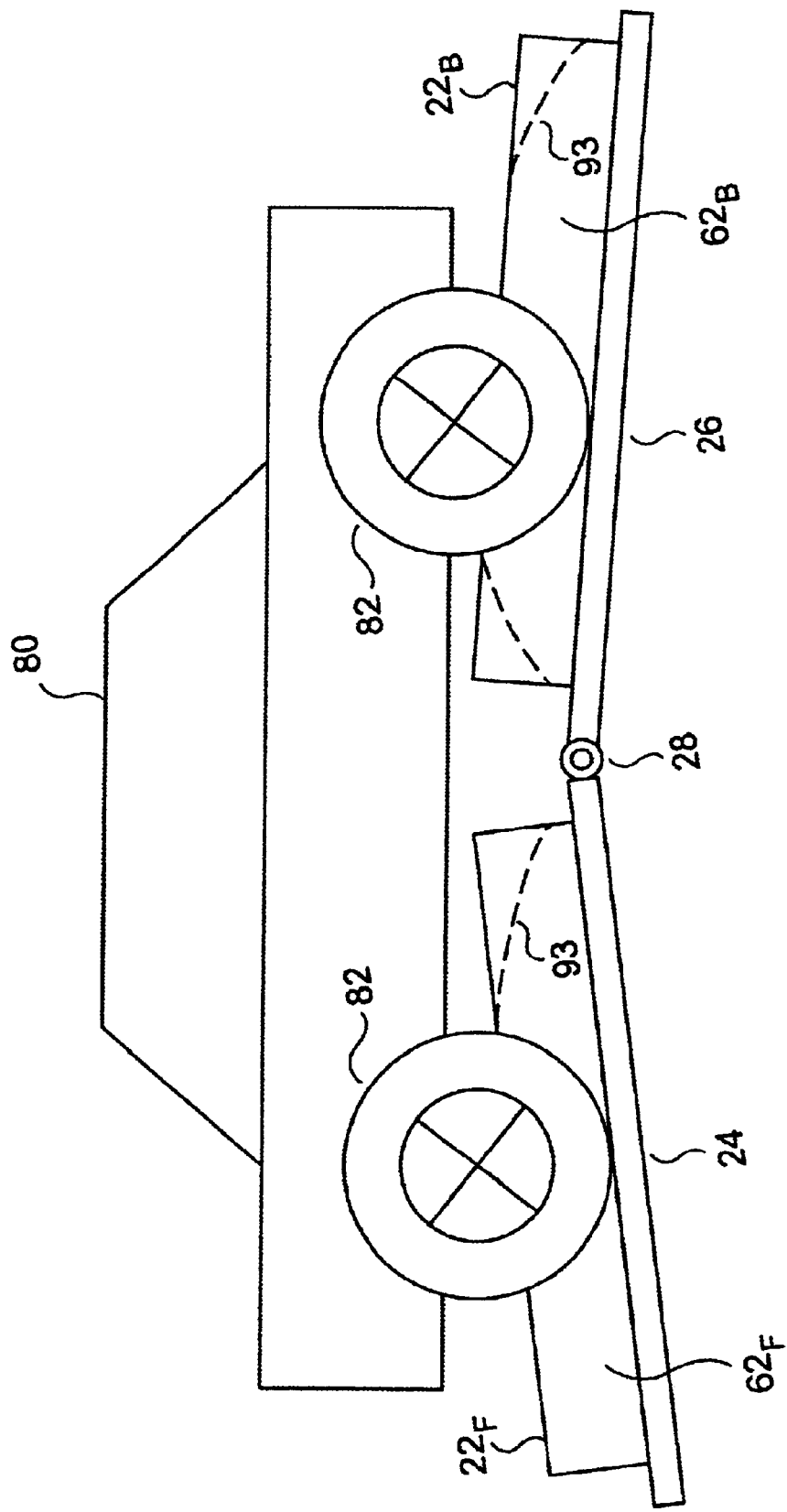
FIG. 15 is a diagrammatic side elevation view of an inventive embodiment, particularly illustrating longitudinal tapering of guide rails so as to avoid interference with a cargo vehicle's under structure.

Now referring to FIG. 15, it will frequently be preferred inventive practice that the vertical portions $62_F$ and $62_B$ of front and back guide rails $22_F$ and $22_B$, respectively, be at least as tall as, or slightly taller than, the lower tire portion of wheel 82. A notable advantage of inventive embodiments wherein guide rails 22 describe inward-facing brackets, vis-a-vis' inventive embodiments wherein guide rails 22 describe outward-facing brackets, is the lack of associated interference between guide rails 22 and the underside of cargo 80, especially when cargo 80 is transitioning between ramp 24 and platform 26. The cargo 80 vehicle is typically characterized by a vehicle ground clearance; the clearance between the cargo 80 vehicle and whatever is beneath it should remain sufficient during operation of inventive system 20. As illustrated in FIG. 15, if front and back guide rails 22 describe inward-facing brackets, then vertical portions 62 of front and back guide rails 22 will tend not to hinder cargo 80 during interaction between cargo 80 and guide rails 22. In contrast, if front and back guide rails 22 describe outward-facing brackets, then vertical portions 62 of front and back guide rails 22 will tend to hinder cargo 80 during interaction between cargo 80 and guide rails 22. This type of interference between vertical portions 62 and cargo 80 may be especially manifest at the back ends $32_F$ of front guide rails $22_F$, at the front ends $30_B$ of back guide rails $22_B$, and at the back ends $32_B$ of back guide rails $22_B$. Accordingly, it may be preferred inventive practice to curvilinearly or rectilinearly taper vertical portions 62 at one or more such locations, such as portrayed by tapers 93 in FIG. 15.

To recapitulate, the present invention typically affords many significant features and advantages. This invention offers a decrease in vehicle ingress/egress times (e.g., into and out of the V-22 aircraft); in military contexts, this is highly desirable when operating in hostile areas. Further, this invention minimizes or eliminates potential for damage to the aircraft because the vehicle maintains its centered position; in military contexts, this is especially important when operating in harsh conditions or at night. Additionally, this invention provides a methodology for distributing the floor load in the aircraft, Moreover, this invention is adjustable for numerous different vehicles. Furthermore, this invention provides additional vehicle tiedown points, is lightweight, and is modular and portable in a kit form.

Other embodiments of this invention will be apparent to those skilled in the art from a consideration of this specification or practice of the invention disclosed herein. Various omissions, modifications and changes to the principles described may be made by one skilled in the art without departing from the true scope and spirit of the invention which is indicated by the following claims.

What is claimed is:

1. Apparatus for facilitating loading upon and conveyance by a carrier of cargo; said carrier including compartment means and passage means communicating with said compartment means; said apparatus comprising four members; each said member including an approximately flat bottom section and an approximately flat side section which meet each other at an approximately right angle so as to define an approximately linear junctional edge; said four members consisting of a first member pair and a second member pair; said first member pair being adaptable to association with said compartment means so that the corresponding said bottom sections are situated approximately in the same imaginary approximately horizontal plane and so that the corresponding said side sections are approximately parallel with respect to each other; said second member pair being adaptable to association with said passage means so that the corresponding said bottom sections are situated approximately in the same imaginary inclined plane and so that the corresponding said side sections are at least substantially oblique with respect to each other; each said member being characterized by an interior right angle; for each said member pair, said interior right angles being generally oppositely disposed in relation to each other; said cargo includes wheel means; said first member pair consisting of a first left member and a first right member; said second member pair consisting of a second left member and a second right member; said first left member having a said bottom section which is a first left bottom section; said first right member having a said bottom section which is a first right bottom section; said second left member having a said bottom section which is a second left bottom section; said second right member having a said bottom section which is a second right bottom section; said first left member having a said side section which is a first left side section; said first right member having a said side section which is a first right side section; said second left member having a said side section which is a second left side section; said second right member having a said side section which is a second right side section; said first left bottom section having a first left upper surface and a first left lower surface; said first right bottom section having a first right upper surface and a first right lower surface; said second left bottom section having a second left upper surface and a second left lower surface; said second right bottom section having a second right upper surface and a second right lower surface; said first left side section having a first left outside surface and a first left inside surface; said first right side section having a first right outside surface and a first right inside surface; said second left side section having a second left outside surface and a second left inside surface; said second right side section having a second right outside surface and a second right inside surface; said first member pair being adaptable to association with said compartment means so that said wheel means is positionable in said compartment means upon at least a portion of said first left upper surface and at least a portion of said first right upper surface; said second member pair being adaptable to association with said passage means so that movement of said wheel means over said passage means is delimited by at least a portion of said second left inside surface and at least a portion of said second right inside surface; said apparatus further comprising adjustment means, for adjusting at least one of:

the distance between said first left inside surface and said second left inside surface; and the distance between said first left outside surface and said second left outside surface.

2. Apparatus as recited in claim 1, wherein:

said compartment means includes a left side wall and a right side wall which generally face each other;

said adjustment means is for adjusting at least two of:
the distance between said first left inside surface and said left side wall;
the distance between said first right inside surface and said right side wall;
the distance between said first left outside surface and said left side wall;
the distance between said first right outside surface and said right side wall; and said adjustment means permits at least two of:
adjacency between said first left inside surface and said left side wall;
adjacency between said first right inside surface and said left side wall; adjacency between said first left outside surface and said left side wall; and
adjacency between said first right outside surface and said right side wall.

3. Apparatus for facilitating loading upon and conveyance by a carrier of cargo; said carrier including compartment means and passage means communicating with said compartment means; said apparatus comprising four members; each said member including an approximately flat bottom section and an approximately flat side section which meet each other at an approximately right angle so as to define an approximately linear junctional edge; said four members consisting of a first member pair and a second member pair; said first member pair being adaptable to association with said compartment means so that the corresponding said bottom sections are situated approximately in the same imaginary approximately horizontal plane and so that the corresponding said side sections are approximately parallel with respect to each other; said second member pair being adaptable to association with said passage means so that the corresponding said bottom sections are situated approximately in the same imaginary inclined plane and so that the corresponding said side sections are at least substantially oblique with respect to each other; each said member being characterized by an interior right angle; for each said member pair, said interior right angles being generally oppositely disposed in relation to each other; said cargo includes wheel means; said first member pair consisting of a first left member and a first right member; said second member pair consisting of a second left member and a second right member; said first left member having a said bottom section which is a first left bottom section; said first right member having a said bottom section which is a first right bottom section; said second left member having a said bottom section which is a second left bottom section; said second right member having a said bottom section which is a second right bottom section; said first left member having a said side section which is a first left side section; said first right member having a said side section which is a first right side section; said second left member having a said side section which is a second left side section; said second right member having a said side section which is a second right side section; said first left bottom section having a first left upper surface and a first left lower surface; said first right bottom section having a first right upper surface and a first right lower surface; said second left bottom section having a second left upper surface and a second left lower surface; said second right bottom section having a second right upper surface and a second right lower surface; said first left side section having a first left outside surface and a first left inside surface; said first right side section having a first right outside surface and a first right inside surface; said second left side section having a second left outside surface and a second left inside surface; said second right side section having a second right outside surface and a second right inside surface; said first member pair being adaptable to association with said compartment means so that said wheel means is positionable in said compartment means upon means upon at least a portion of said first left upper surface and at least a portion of said first right upper surface; said second member pair being adaptable to association with said passage means so that movement of said wheel means over said passage means is delimited by at least a portion of said second left inside surface and at least a portion of said second right inside surface; said apparatus further comprising adjustment means, for adjusting the distance between said second left inside surface and said second right inside surface.

4. Apparatus as recited in claim 1, wherein said first member pair is adaptable to association with said compartment means so that said positioning of said wheel means is delimited by at least a portion of said first left inside surface and at least a portion of said first right inside surface.

5. Apparatus as recited in claim 4, wherein said first member pair is adaptable to association with said compartment means so that:
   said wheel means is travelable upon at least a portion of said first left upper surface and at least a portion of said first right upper surface; and
   the movement of said wheel means is delimited by at least a portion of said first left inside surface and at least a portion of said first right inside surface.

6. Apparatus for facilitating loading upon and conveyance by a carrier of cargo, said carrier including compartment means and passage means communicating with said compartment means, said apparatus comprising four members, each said member including an approximately flat bottom section and an approximately flat side section which meet each other at an approximately right angle so as to define an approximately linear junctional edge, said four members consisting of a first member pair and a second member pair, said first member pair being adaptable to association with said compartment means so that the corresponding said bottom sections are situated approximately in the same imaginary approximately horizontal plane and so that the corresponding said side sections are approximately parallel with respect to each other, said second member pair being adaptable to association with said passage means so that the corresponding said bottom sections are situated approximately in the same imaginary inclined plane and so that the corresponding said side sections are at least substantially oblique with respect to each other, said apparatus further comprising:
   a first attachment means, said first attachment means being for attachment of said first member pair and said compartment means;
   a second attachment means, said second attachment means being for attachment of said second member pair and said passage means.

7. Apparatus as recited in claim 6, further comprising securement means, for securing said cargo with respect to said compartment means.

8. Apparatus for facilitating loading upon and conveyance by a carrier of cargo, said carrier including compartment means and passage means communicating with said compartment means, said apparatus comprising four members, each said member including an approximately flat bottom section and an approximately flat side section which meet each other at an approximately right angle so as to define an approximately linear junctional edge, said four members consisting of a first member pair and a second member pair, said first member pair being adaptable to association with said compartment means so that the corresponding said bottom sections are situated approximately in the same imaginary approximately horizontal plane and so that the corresponding said side sections are approximately parallel with respect to each other, said second member pair being adaptable to association with said passage means so that the corresponding said bottom sections are situated approximately in the same imaginary inclined plane and so that the corresponding said side sections are at least substantially oblique with respect to each other, wherein:
   said cargo includes wheel means;
   said first member pair consists of a first left member and a first right member;
   said first left member has a first left upwardly curved forward portion for delimiting the movement of said wheel means; and
   said first right member has a first right upwardly curved forward portion for delimiting the movement of said wheel means.

9. Apparatus for facilitating loading upon and conveyance by a carrier of cargo, said carrier including compartment means and passage means communicating with said compartment means, said apparatus comprising four members, each said member including an approximately flat bottom section and an approximately flat side section which meet each other at an approximately right angle so as to define an approximately linear junctional edge, said four members consisting of a first member pair and a second member pair, said first member pair being adaptable to association with said compartment means so that the corresponding said bottom sections are situated approximately in the same imaginary approximately horizontal plane and so that the corresponding said side sections are approximately parallel with respect to each other, said second member pair being adaptable to association with said passage means so that the corresponding said bottom sections are situated approximately in the same imaginary inclined plane and so that the corresponding said side sections are at least substantially oblique with respect to each other, wherein:

said first member pair consists of a first left member and a first right member;

said second member pair consists of a second left member and a second right member;

said apparatus further comprises at least one of a first adjustment means and a second adjustment means;

said first adjustment means is for adjusting the distance between said first left member and said second left member; and said second adjustment means is for adjusting the distance between said second left member and said second right member.

10. Apparatus as recited in claim 9, wherein:

said first left member has a first left rear edge;

said first right member has a first right rear edge;

said second left member has a second left forward edge;

said second right member has a second right forward edge; and said first member pair is adaptable to association with said compartment means, and said second member pair is adaptable to association with said passage means, so that said first left rear edge and said second left forward edge are approximately even with each other, and so that said first right rear edge and said second right forward edge are approximately even with each other.

11. Apparatus as recited in claim 9, wherein:

said apparatus further comprises an approximately planar, approximately rectangular pallet structure; and said first adjustment means includes means for providing a clearance between said first left member and said first right member so that said pallet structure fits between said first left member and said second right member.

12. A system for effecting containment of a bearee object by a bearer object, said bearee object having plural wheels, including at least one pair of coaxial wheels, for movement of said bearee object, each said pair of coaxial wheels being characterized by a pair of inside wheel surfaces that face toward each other, said bearer object having a housing for said containment, said system comprising a pair of generally bracket-shaped first structures and a pair of generally bracket-shaped second structures, wherein:

each said structure has two longitudinal ends, a base surface, a support surface, a restrictive surface and a nonrestrictive surface, said base surface and said support surface facing away from each other, said restrictive surface and said nonrestrictive surface facing away from each other, said support surface and said restrictive surface being approximately perpendicular;

said first structures are capable of being housed by said housing, and said second structures are capable of being functionally connected to said first structures, so that:

the corresponding said support surfaces of said first structures are at least substantially coplanar;

the corresponding said restrictive surfaces of said first structures are at least substantially parallel and face away from each other other;

the corresponding said support surfaces of said second structures are at least substantially coplanar;

the corresponding said restrictive surfaces of said second structures arc at least substantially nonparallel and face away from each other;

said first structures and said second structures are approximately aligned whereby the corresponding said restrictive surfaces at a said end of said first structures and the corresponding said restrictive surfaces at a said end of said second structures are approximately even and nearly meet at corresponding junctional locations;

said first structures are compatible with said at least one pair of coaxial wheels whereby the corresponding said wheels are at least substantially supportable by the corresponding said support surfaces of said first structures, and whereby the corresponding said inside wheel surfaces are at least substantially restrictable therebetween by the corresponding said restrictive surfaces of said first structures;

said second structures are compatible with said at least one pair of coaxial wheels whereby the corresponding said inside wheel surfaces are at least substantially guidable therebetween by the corresponding said restrictive surfaces of said second structures and onto the corresponding said support surfaces of said first structures; and the corresponding said restrictive surfaces of said second structures at least substantially slant away from each other in the direction of said corresponding junctional locations.

13. A system for effecting containment of a bearee object by a bearer object, said bearee object having plural wheels, including at least one pair of coaxial wheels, for movement of said bearee object, said bearer object having a housing for said containment, said system comprising a pair of generally bracket-shaped first structures and a pair of generally bracket-shaped second structures, wherein:

each said structure has two longitudinal ends, a base surface, a support surface, a restrictive surface and a nonrestrictive surface, said base surface and said support surface facing in approximately opposite directions, said restrictive surface and said nonrestrictive surface facing in approximately opposite directions, said support surface and said restrictive surface being approximately perpendicular;

each said support surface of said first structures is at least substantially flat;

said system further comprises a first coupling means, for coupling said first structures with said bearer object so that at least a portion of each corresponding said base surface is contiguous to a portion of said bearer object;

said system further comprises a first adjusting means, for adjusting the distance between said first structures;

said first structures are capable of being housed by said housing, and said second structures are capable of being functionally connected to said first structures, so that:

the corresponding said support surfaces of said first structures are approximately coplanar;

the corresponding said restrictive surfaces of said first structures are approximately parallel;

the corresponding said support surfaces of said second structures are approximately coplanar;

the corresponding said restrictive surfaces of said second structures are at least substantially nonparallel;

said first structures and said second structures are approximately aligned whereby the corresponding said restrictive surfaces at a said end of said first structures and the corresponding said restrictive surfaces at a said end of said second structures are approximately even;

said first structures are compatible with said at least one pair of coaxial wheels whereby the corresponding said wheels are at least substantially supportable by the corresponding said support surfaces of said first structures and are at least substantially restrictable by the corresponding said restrictive surfaces of said first structures;

said second structures are compatible with said at least one pair of coaxial wheels whereby the corresponding said wheels are at least substantially channelable by the corresponding said restrictive surfaces of said second structures and onto the corresponding said support surfaces of said first structures.

14. A system for effecting containment as defined in claim 13, wherein:

each said support surface of said second structures is at least substantially flat;

said system further comprises approximately planar passage means for advancing said bearee object toward said bearer object for said effecting of said containment;

said system further comprises a second coupling means, for coupling said second structures with said passage means so that at least a portion of each corresponding said base surface of said second structures is contiguous to a portion of said passage means; and said system further comprises a second adjusting means, for adjusting the distance between said second structures.

15. A system for effecting containment as defined in claim 13, wherein:

said housing leas a pair of interior opposite walls;

said first adjusting means includes means for adjusting the clearances between said first structures and respective ones of said walls; and said means for adjusting the clearances permits proximity of said first structures and respective ones of said walls.

16. Apparatus as recited in claim 6, wherein said passage means includes ramp means.

17. A system for effecting containment as defined in claim 14, wherein said passage means includes ramp means.

* * * * *